United States Patent
Causey et al.

(10) Patent No.: US 9,485,051 B2
(45) Date of Patent: *Nov. 1, 2016

(54) FACILITATION OF SECURITY EMPLOYING A FEMTO CELL ACCESS POINT

(71) Applicant: AT&T Mobility II LLC, Atlanta, GA (US)

(72) Inventors: Mark Causey, Tucker, GA (US); Arthur Richard Brisebois, Cumming, GA (US); Adrianne Binh Luu, Roswell, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/851,999

(22) Filed: Sep. 11, 2015

(65) Prior Publication Data
US 2016/0056915 A1 Feb. 25, 2016

Related U.S. Application Data

(63) Continuation of application No. 13/451,234, filed on Apr. 19, 2012, now Pat. No. 9,166,732.

(51) Int. Cl.
*H04K 3/00* (2006.01)
*H04W 12/12* (2009.01)
(Continued)

(52) U.S. Cl.
CPC ............. *H04K 3/45* (2013.01); *G08B 13/22* (2013.01); *H04K 3/42* (2013.01); *H04K 3/65* (2013.01); *H04K 3/822* (2013.01); *H04K 3/86* (2013.01); *H04W 4/021* (2013.01); *H04W 12/08* (2013.01); *H04W 12/12* (2013.01); *H04W 48/02* (2013.01);
(Continued)

(58) Field of Classification Search
CPC ............ H04K 3/42; H04K 3/45; H04K 1/02; H04K 3/65; H04K 3/822; H04K 3/86
USPC ............................................. 455/1
See application file for complete search history.

(56) References Cited

U.S. PATENT DOCUMENTS

| | | | | |
|---|---|---|---|---|
| 3,710,024 A | * | 1/1973 | Lacey | H04M 11/045 340/531 |
| 4,668,878 A | * | 5/1987 | Wyss | G04G 15/006 307/139 |
| 4,876,545 A | * | 10/1989 | Carlson | G01S 7/021 342/14 |
| 5,287,110 A | * | 2/1994 | Tran | G01S 7/38 342/13 |

(Continued)

OTHER PUBLICATIONS

Donegan, "Apple Goes Patently Fennto," Light Reading Mobile, http://www.lightreading.com/blog.asp? blog_sectionid=414 &doc_id=219279, 1 pg.

*Primary Examiner* — Hai V Nguyen
(74) *Attorney, Agent, or Firm* — Amin, Turocy & Watson, LLP

(57) ABSTRACT

One or more femto cell access points (FAPs) are employed to facilitate provisioning of security. A signal indicative of an intrusion in an area associated with an FAP can be received, and, based on receiving the signal, an identifier associated with a device in a detection range of the FAP can be determined. One or more frequencies in the detection range of the femto cell access point can be jammed, an attachment attempt emitted from the device in response to jamming the frequencies can be detected, and a telephone number of the device can be identified based, at least, on detecting the attachment attempt from the device. Warnings can also be sent to the device and/or tracking of the device can be performed.

20 Claims, 12 Drawing Sheets

(51) Int. Cl.
*G08B 13/22* (2006.01)
H04W 4/02 (2009.01)
*H04W 12/08* (2009.01)
*H04W 48/02* (2009.01)
H04W 64/00 (2009.01)
H04W 88/08 (2009.01)

(52) U.S. Cl.
CPC .......... *H04K 2203/16* (2013.01); *H04W 64/00* (2013.01); *H04W 88/08* (2013.01)

(56) References Cited

U.S. PATENT DOCUMENTS

| | | | | |
|---|---|---|---|---|
| 5,424,808 A * | | 6/1995 | Maekawa | G03G 15/553 399/18 |
| 5,515,285 A * | | 5/1996 | Garrett, Sr. | B60R 25/102 340/426.2 |
| 5,515,419 A | | 5/1996 | Sheffer | |
| 5,790,952 A | | 8/1998 | Seazholtz et al. | |
| 5,793,476 A * | | 8/1998 | Laakmann | G01P 3/36 356/28 |
| 5,796,942 A * | | 8/1998 | Esbensen | H04L 12/2602 709/229 |
| 5,950,110 A * | | 9/1999 | Hendrickson | H04K 3/22 340/539.1 |
| 5,966,655 A | | 10/1999 | Hardouin | |
| 5,982,281 A * | | 11/1999 | Layson | G07C 9/00103 340/539.13 |
| 6,194,997 B1 * | | 2/2001 | Buchner | B60R 25/24 307/10.2 |
| 6,313,739 B1 * | | 11/2001 | Roth | G01S 7/4972 180/273 |
| 6,343,212 B1 | | 1/2002 | Weber et al. | |
| 6,353,406 B1 * | | 3/2002 | Lanzl | G01S 13/84 340/10.1 |
| 6,496,111 B1 * | | 12/2002 | Hosack | G08B 25/001 340/10.1 |
| 6,520,535 B1 * | | 2/2003 | Stanley | B60N 2/002 180/271 |
| 6,580,372 B1 | | 6/2003 | Harris | |
| 6,624,739 B1 * | | 9/2003 | Stobbe | G07C 9/00087 235/382 |
| 6,624,750 B1 * | | 9/2003 | Marman | G08B 25/003 340/4.3 |
| 6,676,382 B2 * | | 1/2004 | Leighton | F04D 29/2222 417/12 |
| 6,676,615 B2 * | | 1/2004 | Flick | A61H 23/0263 601/148 |
| 6,762,676 B2 * | | 7/2004 | Teowee | B60R 25/1004 250/342 |
| 6,765,492 B2 | | 7/2004 | Harris | |
| 6,930,614 B2 * | | 8/2005 | Rackham | B60R 25/1004 340/425.5 |
| 6,957,067 B1 * | | 10/2005 | Iyer | H04L 63/1416 370/338 |
| 6,980,815 B1 * | | 12/2005 | Enzmann | H04W 64/00 455/420 |
| 6,986,161 B2 * | | 1/2006 | Billhartz | H04L 63/123 709/224 |
| 7,023,356 B2 | | 4/2006 | Burkhardt et al. | |
| 7,023,979 B1 * | | 4/2006 | Wu | H04M 3/5233 379/265.11 |
| 7,039,425 B1 * | | 5/2006 | Mazawa | H04W 48/04 340/1.1 |
| 7,042,353 B2 * | | 5/2006 | Stilp | G05B 9/03 340/539.22 |
| 7,053,768 B2 * | | 5/2006 | Seshadri | G08B 29/16 340/506 |
| 7,054,642 B1 * | | 5/2006 | Matz | H04M 3/38 455/405 |
| 7,068,998 B2 * | | 6/2006 | Zavidniak | H04L 63/1416 455/410 |
| 7,076,803 B2 * | | 7/2006 | Bruton, III | H04L 63/1408 713/164 |
| 7,079,020 B2 * | | 7/2006 | Stilp | G06K 7/0008 340/506 |
| 7,158,022 B2 * | | 1/2007 | Fallon | G08B 13/19656 340/505 |
| 7,170,404 B2 * | | 1/2007 | Albert | G04G 13/021 340/517 |
| 7,202,784 B1 * | | 4/2007 | Herwig | G06K 7/0008 340/10.1 |
| 7,202,789 B1 * | | 4/2007 | Stilp | G05B 9/03 340/568.2 |
| 7,202,798 B2 | | 4/2007 | Harris | |
| 7,236,766 B2 * | | 6/2007 | Freeburg | 455/404.1 |
| 7,257,107 B2 * | | 8/2007 | Swier, Jr. | H04L 63/10 370/328 |
| 7,283,048 B2 * | | 10/2007 | Stilp | G05B 9/03 340/539.1 |
| 7,295,119 B2 * | | 11/2007 | Rappaport | G06F 17/509 340/5.8 |
| 7,324,839 B2 * | | 1/2008 | Kuroiwa | H04M 1/663 455/456.3 |
| 7,336,670 B1 * | | 2/2008 | Calhoun | H04L 63/10 370/252 |
| 7,409,715 B2 * | | 8/2008 | Gariador | H04L 63/1408 726/22 |
| 7,495,544 B2 * | | 2/2009 | Stilp | G05B 9/03 340/10.1 |
| 7,511,614 B2 * | | 3/2009 | Stilp | G05B 9/03 340/3.1 |
| 7,518,500 B2 * | | 4/2009 | Aninye | G07C 9/00111 340/506 |
| 7,532,114 B2 * | | 5/2009 | Stilp | G05B 9/03 340/10.1 |
| 7,532,895 B2 * | | 5/2009 | Hrastar | H04L 41/0893 455/456.1 |
| 7,629,880 B2 * | | 12/2009 | Stilp | G08B 1/08 340/506 |
| 7,684,784 B2 * | | 3/2010 | Parthasarathy | H04B 1/0003 380/255 |
| 7,738,008 B1 * | | 6/2010 | Ball | G06K 9/00214 348/159 |
| 7,774,839 B2 * | | 8/2010 | Nazzal | H04L 63/14 726/22 |
| 7,788,720 B2 * | | 8/2010 | Patil | G06F 21/554 709/224 |
| 7,834,775 B2 * | | 11/2010 | Ko | H04B 1/1036 340/661 |
| 7,849,500 B2 * | | 12/2010 | Rosenberger | H04L 12/2602 726/22 |
| 7,907,565 B2 * | | 3/2011 | Van de Groenendaal | H04L 41/12 370/329 |
| 7,974,645 B2 * | | 7/2011 | Choi-Grogan | H04W 8/04 370/328 |
| 8,009,013 B1 * | | 8/2011 | Hirschfeld | G07C 9/00103 235/375 |
| 8,052,144 B2 * | | 11/2011 | Kaneko | B41J 11/006 271/258.02 |
| 8,059,619 B2 * | | 11/2011 | Jakobsen | H04K 3/226 370/337 |
| 8,069,483 B1 * | | 11/2011 | Matlock | H04W 12/12 713/154 |
| 8,106,777 B2 * | | 1/2012 | Soto | G08B 13/2488 340/10.1 |
| 8,126,496 B2 * | | 2/2012 | Brisebois | H04W 52/143 370/252 |
| 8,144,725 B2 * | | 3/2012 | Bienas | H04W 24/02 370/449 |
| 8,155,670 B2 * | | 4/2012 | Fullam | H04W 4/021 370/332 |
| 8,208,848 B2 * | | 6/2012 | Daugherty, Jr. | H04B 1/1027 340/7 |
| 8,219,094 B2 * | | 7/2012 | Huber | G06Q 20/1235 455/436 |
| 8,224,233 B2 * | | 7/2012 | Brisebois | H04K 3/42 455/1 |
| 8,254,368 B2 * | | 8/2012 | Huber | G06Q 20/1235 370/310 |

(56) References Cited

U.S. PATENT DOCUMENTS

| | | | | |
|---|---|---|---|---|
| 8,254,886 B2* | 8/2012 | Salkini | H04L 63/10 | 455/411 |
| 8,265,613 B2* | 9/2012 | Brisebois | G06Q 20/202 | 455/404.1 |
| 8,274,958 B2* | 9/2012 | Huber | G06Q 20/1235 | 370/338 |
| 8,351,916 B2* | 1/2013 | Fan | H04M 3/02 | 455/404.1 |
| 8,452,305 B2* | 5/2013 | Brisebois | H04K 3/42 | 455/456.1 |
| 8,463,296 B2* | 6/2013 | Huber | G06Q 20/1235 | 455/456.3 |
| 8,479,266 B1* | 7/2013 | Delker | H04L 63/0272 | 709/221 |
| 8,483,689 B2* | 7/2013 | Gurusamy | H04W 48/16 | 455/436 |
| 8,559,865 B2* | 10/2013 | Weissman | H04B 1/1027 | 342/16 |
| 8,583,078 B2* | 11/2013 | Sweeney | H04W 48/04 | 379/114.21 |
| 8,611,847 B2* | 12/2013 | Snider | B60R 25/00 | 340/426.1 |
| 8,611,884 B2* | 12/2013 | Fan | H04M 3/02 | 455/404.1 |
| 8,615,593 B2* | 12/2013 | Ch'ng | H04W 48/08 | 455/432.1 |
| 8,626,143 B2* | 1/2014 | Haughn | G06F 8/65 | 455/418 |
| 8,626,195 B2* | 1/2014 | Noonan | H04W 8/005 | 370/331 |
| 8,648,692 B2* | 2/2014 | Himmelstein | G10L 17/22 | 340/5.1 |
| 8,660,556 B2 | 2/2014 | Beattie et al. | | |
| 8,692,665 B2 | 4/2014 | Hicks, III | | |
| 8,755,820 B2* | 6/2014 | Huber | G06Q 20/1235 | 455/444 |
| 8,761,661 B2* | 6/2014 | Brisebois | H04K 3/42 | 455/1 |
| 8,761,799 B2* | 6/2014 | Meredith | H04W 12/06 | 455/456.1 |
| 8,761,821 B2* | 6/2014 | Tibbitts | H04W 48/04 | 455/297 |
| 8,787,342 B2* | 7/2014 | Huber | G06Q 20/1235 | 370/230 |
| 8,789,191 B2* | 7/2014 | Bhagwat | H04L 12/2602 | 726/25 |
| 8,792,419 B2* | 7/2014 | Wohlert | H04W 4/04 | 370/328 |
| 8,798,017 B2* | 8/2014 | Liu | H04W 36/0022 | 370/338 |
| 8,831,677 B2* | 9/2014 | Villa-Real | H04M 1/66 | 455/552.1 |
| 8,868,696 B2* | 10/2014 | Lewis | H04W 12/08 | 370/254 |
| 8,897,694 B2* | 11/2014 | Brisebois | H04K 3/42 | 455/1 |
| 8,983,446 B2* | 3/2015 | Nadler | H04W 48/04 | 455/418 |
| 8,989,701 B2* | 3/2015 | Gauthier | H04W 12/02 | 455/406 |
| 8,989,766 B2* | 3/2015 | Noonan | G01S 5/02 | 340/5.61 |
| 9,003,527 B2* | 4/2015 | Bhagwat | H04L 12/2602 | 726/23 |
| 9,008,698 B2* | 4/2015 | Meredith | H04W 12/06 | 455/422.1 |
| 9,037,134 B2* | 5/2015 | Grob | H04W 36/04 | 370/310.2 |
| 9,070,264 B2* | 6/2015 | Sivertsen | G08B 13/08 | |
| 9,226,259 B2* | 12/2015 | Noonan | H04W 8/005 | |
| 2002/0066034 A1* | 5/2002 | Schlossberg | G06F 21/552 | 726/23 |
| 2002/0083343 A1* | 6/2002 | Crosbie | G06F 21/552 | 726/23 |
| 2002/0087882 A1* | 7/2002 | Schneier | G06F 21/552 | 726/23 |
| 2003/0070084 A1* | 4/2003 | Satomaa | H04L 12/24 | 726/11 |
| 2003/0135762 A1* | 7/2003 | Macaulay | H04L 63/1466 | 726/22 |
| 2003/0154399 A1* | 8/2003 | Zuk | H04L 63/0254 | 726/11 |
| 2003/0200455 A1* | 10/2003 | Wu | H04L 63/1408 | 726/23 |
| 2003/0217289 A1* | 11/2003 | Ammon | H04L 63/1416 | 726/23 |
| 2003/0232598 A1* | 12/2003 | Aljadeff | G01S 5/06 | 455/41.2 |
| 2004/0003285 A1* | 1/2004 | Whelan | H04L 63/1408 | 726/23 |
| 2004/0028016 A1* | 2/2004 | Billhartz | H04L 63/123 | 370/338 |
| 2004/0068668 A1* | 4/2004 | Lor | H04L 63/107 | 726/15 |
| 2004/0085202 A1* | 5/2004 | Naidoo | G08B 5/002 | 340/531 |
| 2004/0107219 A1* | 6/2004 | Rosenberger | H04L 12/2602 | |
| 2004/0143602 A1* | 7/2004 | Ruiz | H04N 7/181 | |
| 2004/0162995 A1* | 8/2004 | Muaddi | H04L 63/1408 | 726/23 |
| 2004/0212493 A1* | 10/2004 | Stilp | G06K 7/0008 | 340/531 |
| 2004/0212500 A1* | 10/2004 | Stilp | G08B 19/005 | 340/541 |
| 2004/0235453 A1* | 11/2004 | Chen | H04L 63/1416 | 455/410 |
| 2004/0236547 A1* | 11/2004 | Rappaport | G06F 17/509 | 703/2 |
| 2004/0252837 A1* | 12/2004 | Harvey | H04L 63/1416 | 380/270 |
| 2005/0025182 A1* | 2/2005 | Nazari | H04W 88/06 | 370/469 |
| 2005/0037733 A1* | 2/2005 | Coleman | H04B 7/086 | 455/411 |
| 2005/0042999 A1* | 2/2005 | Rappaport | H04B 1/719 | 455/307 |
| 2005/0258946 A1* | 11/2005 | Forte | B60R 25/102 | 340/426.24 |
| 2005/0262519 A1* | 11/2005 | Luebke | G08B 13/19636 | 719/318 |
| 2006/0010504 A1* | 1/2006 | Sharma | G08B 13/1436 | 726/35 |
| 2006/0017579 A1* | 1/2006 | Albert | G04G 13/021 | 340/628 |
| 2006/0099968 A1 | 5/2006 | Harris | | |
| 2006/0183460 A1* | 8/2006 | Srinivasan | G08B 25/006 | 455/410 |
| 2006/0205384 A1* | 9/2006 | Chang | H04M 1/72538 | 455/410 |
| 2007/0052518 A1* | 3/2007 | Nakamura | G08B 25/008 | 340/5.3 |
| 2007/0132546 A1* | 6/2007 | Nakamura | G06F 21/31 | 340/5.3 |
| 2007/0146127 A1* | 6/2007 | Stilp | G08B 1/08 | 340/531 |
| 2008/0057939 A1* | 3/2008 | Choi-Grogan | H04W 68/02 | 455/425 |
| 2008/0096518 A1* | 4/2008 | Mock | H04W 48/04 | 455/404.1 |
| 2008/0137624 A1* | 6/2008 | Silverstrim | G08B 21/12 | 370/338 |
| 2008/0151050 A1* | 6/2008 | Self | G08B 13/19658 | 348/143 |
| 2008/0191857 A1* | 8/2008 | Mojaver | G08B 25/005 | 340/500 |
| 2009/0164547 A1* | 6/2009 | Ch'ng | H04W 48/08 | 709/201 |
| 2009/0233623 A1* | 9/2009 | Johnson | H04W 4/02 | 455/456.3 |
| 2009/0257416 A1* | 10/2009 | Walker | H04W 8/20 | 370/338 |
| 2009/0264155 A1* | 10/2009 | Nakayama | G08B 21/22 | 455/561 |

(56) References Cited

U.S. PATENT DOCUMENTS

| | | | |
|---|---|---|---|
| 2009/0286510 A1* | 11/2009 | Huber | G06Q 20/1235 455/410 |
| 2009/0286540 A1* | 11/2009 | Huber | G06Q 20/1235 455/435.1 |
| 2009/0299788 A1* | 12/2009 | Huber | G06Q 20/1235 455/456.3 |
| 2009/0315699 A1* | 12/2009 | Satish | G08B 25/009 340/533 |
| 2010/0015948 A1* | 1/2010 | Nagano | G08B 25/008 455/410 |
| 2010/0027521 A1* | 2/2010 | Huber | G06Q 20/1235 370/338 |
| 2010/0064341 A1* | 3/2010 | Aldera | H04L 63/102 726/1 |
| 2010/0074112 A1* | 3/2010 | Derr | H04L 41/12 370/232 |
| 2010/0093434 A1* | 4/2010 | Rivas | A63F 13/12 463/35 |
| 2010/0128709 A1* | 5/2010 | Liu | H04W 36/0022 370/338 |
| 2010/0277271 A1* | 11/2010 | Elliot | H04M 3/08 340/3.42 |
| 2010/0277328 A1* | 11/2010 | Mullan | G08B 29/185 340/665 |
| 2010/0289627 A1* | 11/2010 | McAllister | G06Q 10/087 340/10.42 |
| 2010/0318794 A1* | 12/2010 | Dierickx | B60R 25/04 713/164 |
| 2010/0328032 A1* | 12/2010 | Rofougaran | G06F 21/32 340/5.82 |
| 2011/0002314 A1* | 1/2011 | Choi | H04W 72/0453 370/338 |
| 2011/0030016 A1* | 2/2011 | Pino, Jr. | H04L 12/2818 725/80 |
| 2011/0059688 A1 | 3/2011 | Noonan et al. | |
| 2011/0086614 A1* | 4/2011 | Brisebois | H04K 3/42 455/411 |
| 2011/0149078 A1* | 6/2011 | Fan | G08B 13/19669 348/152 |
| 2011/0151791 A1* | 6/2011 | Snider | B60R 25/00 455/63.1 |
| 2011/0205977 A1* | 8/2011 | Gallagher | H04L 12/66 370/329 |
| 2011/0219230 A1* | 9/2011 | Oberheide | H04L 9/32 713/168 |
| 2011/0230171 A1* | 9/2011 | Kasper | G08B 13/2491 455/414.1 |
| 2011/0237269 A1 | 9/2011 | Chen | |
| 2011/0249658 A1* | 10/2011 | Wohlert | H04W 4/04 370/338 |
| 2011/0250895 A1* | 10/2011 | Wohlert | H04W 4/16 455/445 |
| 2011/0279270 A1* | 11/2011 | Marckwald | G08B 13/196 340/545.1 |
| 2012/0036271 A1* | 2/2012 | Patil | H04L 63/0272 709/227 |
| 2012/0038281 A1* | 2/2012 | Verfuerth | H05B 37/0272 315/152 |
| 2012/0046012 A1 | 2/2012 | Forutanpour et al. | |
| 2012/0149350 A1* | 6/2012 | Fan | H04M 3/02 455/418 |
| 2012/0150966 A1* | 6/2012 | Fan | G06Q 10/107 709/206 |
| 2012/0244794 A1* | 9/2012 | Brisebois | H04K 3/42 455/1 |
| 2012/0276838 A1* | 11/2012 | Edwards | H04K 3/45 455/1 |
| 2012/0286951 A1* | 11/2012 | Hess | G08B 25/008 340/539.1 |
| 2012/0289221 A1* | 11/2012 | Huber | G06Q 20/1235 455/422.1 |
| 2012/0289246 A1* | 11/2012 | Huber | G06Q 20/1235 455/456.1 |
| 2012/0319829 A1* | 12/2012 | Machado | B60R 25/24 340/426.18 |
| 2013/0023234 A1* | 1/2013 | Poon | H04W 12/02 455/411 |
| 2013/0078954 A1* | 3/2013 | Fan | H04M 3/02 455/411 |
| 2013/0095836 A1* | 4/2013 | Carmon | H04W 52/0206 455/438 |
| 2013/0103833 A1* | 4/2013 | Ringland | H04L 63/0823 709/224 |
| 2013/0107041 A1* | 5/2013 | Norem | H04N 5/225 348/143 |
| 2013/0109379 A1 | 5/2013 | Shi et al. | |
| 2013/0110455 A1* | 5/2013 | Scholes | G01S 17/026 702/150 |
| 2013/0132854 A1* | 5/2013 | Raleigh | G06F 3/0482 715/738 |
| 2013/0143553 A1 | 6/2013 | Beattie et al. | |
| 2013/0215786 A1* | 8/2013 | Breuer | H04B 1/7097 370/252 |
| 2013/0237142 A1* | 9/2013 | Brisebois | H04K 3/42 455/1 |
| 2013/0252632 A1* | 9/2013 | Huber | G06Q 20/1235 455/456.1 |
| 2013/0276124 A1* | 10/2013 | Tahir | G06F 21/577 726/25 |
| 2013/0281005 A1* | 10/2013 | Causey | H04K 3/65 455/1 |
| 2013/0316738 A1 | 11/2013 | Noonan | |
| 2013/0337789 A1* | 12/2013 | Johnson | H04W 4/02 455/414.1 |
| 2014/0018059 A1* | 1/2014 | Noonan | H04W 48/04 455/419 |
| 2014/0080445 A1 | 3/2014 | Noonan et al. | |
| 2014/0141779 A1* | 5/2014 | Yuk | H04W 48/16 455/434 |
| 2014/0194084 A1 | 7/2014 | Noonan et al. | |
| 2014/0227962 A1* | 8/2014 | Brisebois | H04K 3/42 455/1 |
| 2014/0228050 A1* | 8/2014 | Huber | G06Q 20/1235 455/456.1 |
| 2014/0243024 A1* | 8/2014 | Daly | H04W 48/04 455/456.4 |
| 2014/0254579 A1* | 9/2014 | Huber | G06Q 20/1235 370/338 |
| 2014/0266669 A1* | 9/2014 | Fadell | G05B 19/042 340/501 |
| 2014/0287767 A1* | 9/2014 | Wohlert | H04W 4/04 455/445 |
| 2015/0007162 A1* | 1/2015 | Lewis | H04W 12/08 717/171 |
| 2015/0056915 A1* | 2/2015 | Brisebois | H04K 3/42 455/1 |

* cited by examiner

FACILITATION OF SECURITY EMPLOYING A FEMTO CELL ACCESS POINT

CROSS-REFERENCE TO RELATED APPLICATION

This application is a continuation of, and claims priority to, U.S. patent application Ser. No. 13/451,234 (now U.S. Pat. No. 9,166,732), filed Apr. 19, 2012, and entitled "FACILITATION OF SECURITY EMPLOYING A FEMTO CELL ACCESS POINT," the entirety of which application is hereby incorporated herein by reference.

TECHNICAL FIELD

The disclosure relates to wireless communications and, more particularly, to various embodiments that facilitate security employing a femto cell access point.

BACKGROUND

One purpose of home security systems is to try to determine that an intrusion into a secure area has occurred. However, information regarding the intruder is often limited and, at times, non-existent. In some instances of intrusion, an image of the intruder may be captured via video camera filming the secure area. However, an image of the intruder is of limited utility. Additionally, because there is a inherent delay between the time that intrusion is detected and the arrival of law enforcement, intruders often escape, and thereby stolen property may be permanently lost.

DETAILED DESCRIPTION

Figure 1:
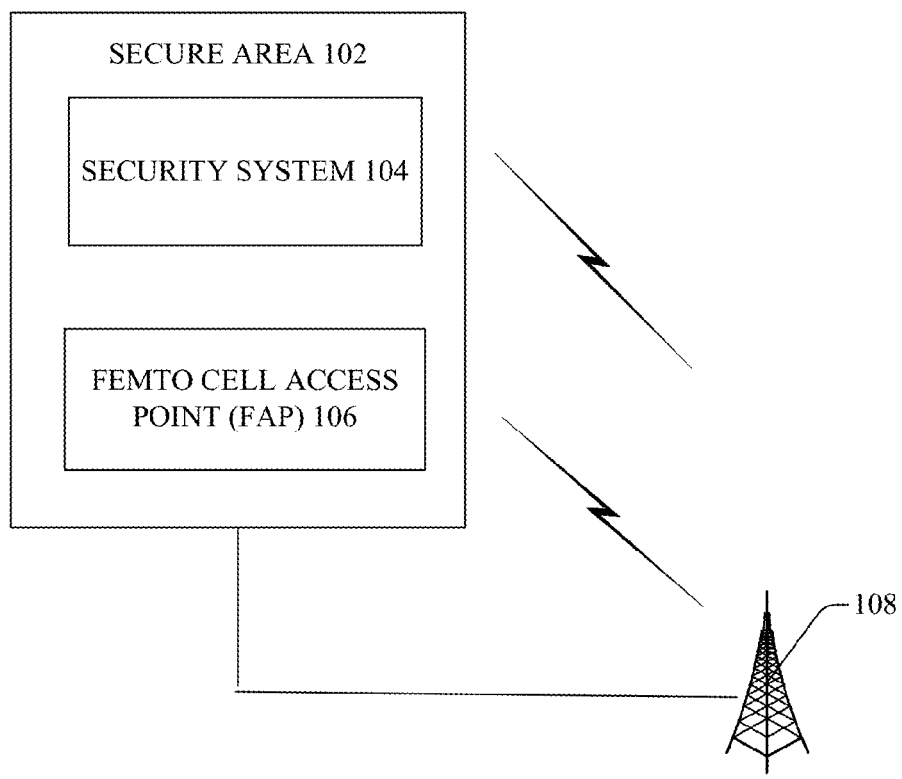
FIG. 1 illustrates an example system that facilitates security employing an FAP.

The following description and the annexed drawings set forth certain illustrative embodiments of the embodiments. These embodiments are indicative, however, of but a few of the various ways in which the principles of the embodiments can be employed. Other features of the embodiments will become apparent from the following detailed description of the embodiments when considered in conjunction with the drawings.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this application, the terms "component," "module," "system," "interface," "platform," "service," "framework," "connector," "controller" or the like are generally intended to refer to a computer-related entity, either hardware, a combination of hardware and software, software or software in execution or an entity related to an operational machine with one or more specific functionalities. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include input/output (I/O) components as well as associated processor, application, and/or application programming interface (API) components.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "base station (BS)," "Node B," "evolved Node B (eNode B)," "home Node B (HNB)"

and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

Embodiments described herein can be exploited in substantially any wireless communication technology, including, but not limited to, Wireless Fidelity (Wi-Fi), Global System for Mobile Communications (GSM), Universal Mobile Telecommunications System (UMTS), Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), Zigbee and other 802.XX wireless technologies and/or legacy telecommunication technologies. Further, the term "femto" and "femto cell" are used interchangeably, and the terms "macro" and "macro cell" are used interchangeably.

With the onslaught of communications and advancement of technology, the use of femto cells (FAPs) in commercial and residential areas is widespread. In the past, FAPs have been utilized for traditional facilitation of communication of mobile devices listed on a white list for the FAP. In this regard, various embodiments disclosed herein facilitate security using FAPs.

In one embodiment, a method can comprise receiving, by a system comprising at least one processor, a signal indicative of an intrusion in an area associated with a femto cell access point, and determining, by the system, an identifier associated with a device in a detection range of the femto cell access point, the determining being based, at least, on the receiving the signal indicative of the intrusion.

In another embodiment, a system can comprise a memory that stores computer executable instructions, and a processor that is communicatively coupled to the memory and that facilitates execution of the computer executable instructions to at least receive a signal indicative of an intrusion in an area associated with a femto cell access point, and determine an identifier associated with a device in a detection range of the femto cell access point based, at least, on reception of the signal indicative of the intrusion.

In another embodiment, a computer-readable storage medium can have computer-executable instructions stored thereon that, in response to execution, cause a computing system comprising at least one processor to perform operations. The operations can comprise receiving a signal indicative of an intrusion in an area associated with a femto cell access point, determining an identifier associated with a device in a detection range of the femto cell access point, the determining being based, at least, on the receiving signal being indicative of the intrusion, jamming a frequency in the detection range of the femto cell access point, detecting an attachment attempt emitted from the device in response to the jamming the frequency, and identifying a telephone number of the device based, at least, on the detecting the attachment attempt from the device.

Various embodiments described herein relate to facilitating security employing one or more FAPs. In some embodiments, an FAP in an area can receive a signal indicative of an intrusion (e.g., burglary) in the area. The FAP can receive the signal from a security system associated with providing security for the area, for example. In response to receiving the signal indicative of the intrusion, the FAP can discover an identification and/or telephone number of a device (e.g., cellular telephone) in the area of the intrusion that may be associated with the intruder. In some embodiments, the FAP can discover the identification and/or telephone number for the device by jamming one or more frequencies in the detection range of the FAP and detecting one or more attachment attempts emitted from the device in response to jamming the frequency on which the device would transmit. The FAP can store the information retrieved, transmit the information to law enforcement, initiate a warning associated with the intrusion and/or initiate tracking of the device.

One or more embodiments can advantageously increase the likelihood of shortening intrusion time, eliminating the theft of property and/or apprehension of suspects in intrusions. One or more embodiments can also advantageously block communication from a device associated with an intruder to reduce the likelihood that the intruder can coordinate escape from a burglarized area.

FIG. 1 illustrates an example system that facilitates security employing an FAP. System 100 can include a security system 104, an FAP 106 and/or a core network 108. In some embodiments, one or more of the security system 104, FAP 106 and/or core network 108 can be electrically and/or communicatively coupled to one another to perform one or more functions of system 100.

The security system 104 and the FAP 106 can be located in a secure area 102 (e.g., a commercial building, residential building, gated open air area or the like). In some embodiments, the security system 104 and/or the FAP 106 are located outside of the secure area 102 while serving the secure area 102. For example, the FAP 106 can be located outside of the secure area 102 while emitting signals that provide connectivity to mobile devices that can be located inside of the secure area 102.

The security system 104 can monitor and detect an intrusion into the secure area 102. In some embodiments, the security system 104 can transmit a signal to the FAP 106 in response to detection of the intrusion. The security system 104 can transmit the signal to the FAP 106 via a wired and/or wireline connection in various embodiments.

The core network 108 can be or can include a wireless or wired network to which the FAP 106 is communicatively coupled in some embodiments. For example, the core network 108 can include a broadband landline to which the FAP 106 is communicatively coupled. As another example, the core network 108 can be or include one or more public cell sites. For example, the core network 108 can include the public cell site to which a mobile device in an area served by the FAP 106 would be communicatively coupled immediately upon leaving the wireless channel associated with the FAP 106. In some embodiments, the core network 108 can include one or more macro cells communicatively coupled to the FAP 106.

The FAP 106 can provide one or more access point services to one or more mobile devices on the white list of the FAP 106. Additionally, the FAP 106 can be configured to conduct network listening on the mobility network within a selected geographical proximity to the FAP 106. Based on the network listening, the FAP 106 can determine one or more frequencies in the area serviced by the FAP 106. In various embodiments, the FAP 106 can store the frequencies detected for use in facilitating security via jamming operations as described herein.

The FAP 106 can transmit and/or receive information to and/or from the security system 104 and/or core network 108. In some embodiments, the FAP 106 can receive the signal indicative of an intrusion into the secure area 102. The FAP 106 can receive the signal from the security system 104 in some embodiments. In other embodiments, the FAP 106 can receive the signal from any number of other sources capable of determining that an intrusion has occurred and/or capable of receiving information about the intrusion from the security system 104. For example, the FAP 106 could receive the signal indicative of the intrusion from a network operator contacted by the security system 104.

In response to receiving the signal indicative of the intrusion, the FAP 106 can perform identification, warning and/or tracking functions on devices in the area served by the FAP 106.

Figure 2:
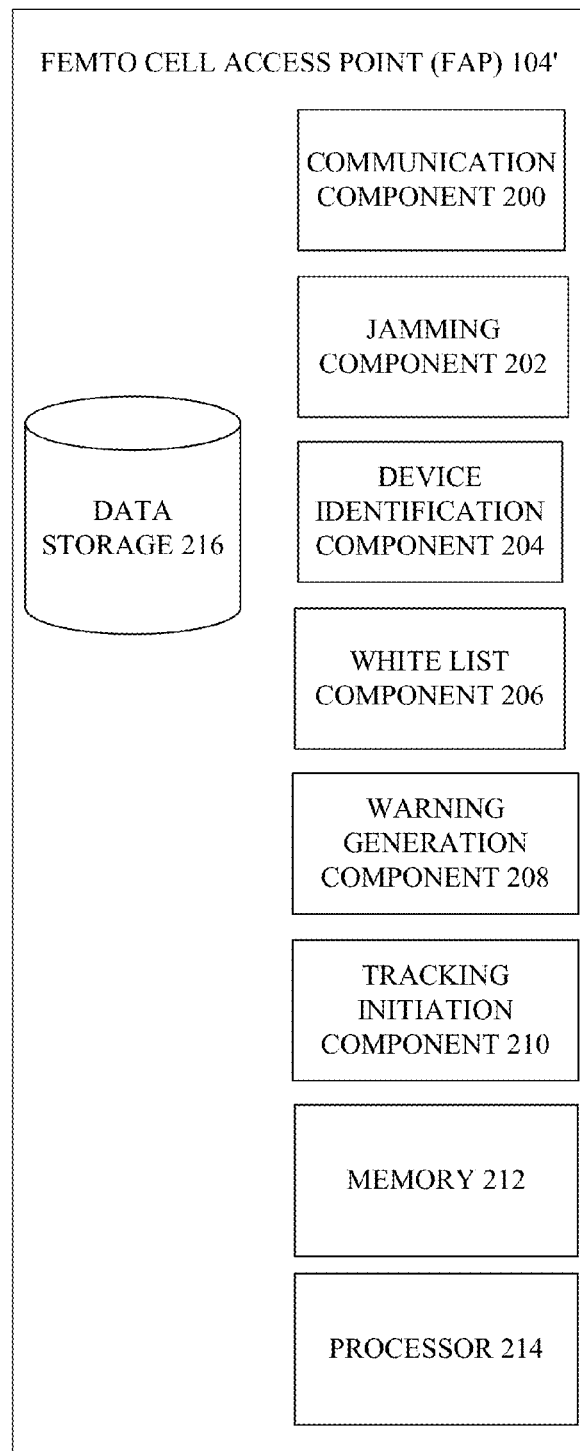
FIG. 2 illustrates an example FAP that can be employed to facilitate security.
Figure 3:
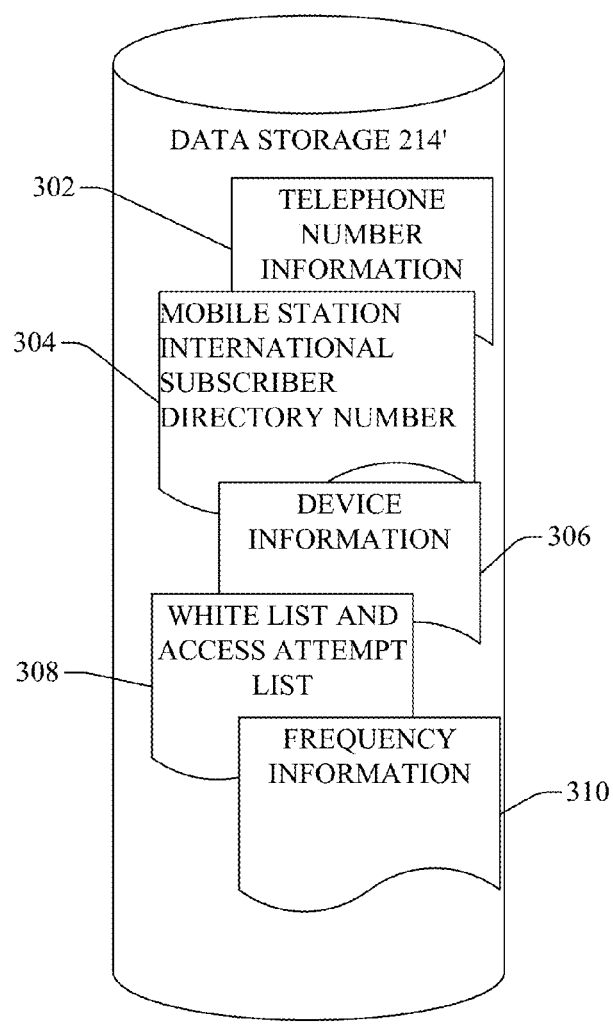
FIG. 3 illustrates an example data storage of an FAP that facilitates security.

The structure and/or functionality of the FAP 106 will now be described in more detail with reference to the remaining figures. Turning first to FIGS. 2 and 3, FIG. 2 illustrates an example FAP (e.g., FAP 106, 106') that can be employed to facilitate security. FIG. 3 illustrates an example data storage of the FAP through which security can be facilitated. The FAP 106' can include one or more of the structure and/or functionality of the FAP 106 described with reference to FIG. 1.

The FAP 106' can include a communication component 200, a jamming component 202, a device identification component 204, a white list component 206, a warning generation component 208, a tracking initiation component 210, a memory 212, a processor 214 and/or data storage 216. In some embodiments, one or more of the communication component 200, jamming component 202, device identification component 204, white list component 206, warning generation component 208, tracking initiation component 210, memory 212, processor 214 and/or data storage 216 can be electrically and/or communicatively coupled to one another to perform one or more of the functions of the FAP 106'.

The communication component 200 can be configured to transmit and/or receive signals to and/or from the core network 108, security system 104 and/or mobile devices on the white list of the FAP 106'. For example, in some embodiments, the communication component 200 can receive a signal indicative of an intrusion in an area associated with the FAP 106'. The signal can be received from the security system 104 in some embodiments.

In some embodiments, the communication component 200 can perform network listening to determine one or more frequencies serving an area covered by the FAP 106'. The FAP 106' can store the frequency information 310 in data storage 214' of the FAP 106'. In some embodiments, the frequency information can be stored at a location remote from the FAP 106' and accessed during an intrusion.

The jamming component 202 can jam one or more frequencies in the detection range of the FAP 106' in response to the communication component 200 receiving the signal indicative of the intrusion. In some embodiments, jamming can be commenced upon activation of a security system alarm or other indicator that an intrusion has occurred. In various embodiments, the frequencies jammed can be the one or more frequencies identified during network listening performed by the communication component 200.

In some embodiments, the jamming component 202 can jam the one or more frequencies until a telephone number or other identification for the device in the detection range of the FAP 106' that fails to be on the white list of the FAP 106' is retrieved. The white list 308 of the FAP 106' can be stored in the data storage 214'.

In some embodiments, the jamming component 202 can jam the one or more frequencies until a telephone number or other identification for a device in the area served by the FAP 106' is retrieved. As such, in various embodiments, devices associated with information or telephone numbers that appear on an access attempt list for the FAP 106' can also be determined as persons carrying such devices could be intruders into secure areas.

After retrieval of the telephone number and/or identification, the jamming component 202 can cease jamming the frequencies. As such, one or more telephone calls to the device associated with the intruder and/or to or from a telephone on a white list of the FAP 106' can be commenced during or after the intrusion. In some embodiments, the jamming component 202 can cease jamming the one or more frequencies after a selected period of time. Accordingly, the amount of time during which the frequencies are jammed, and communication disabled through the FAP 106' can be limited.

In some embodiments, in response to jamming the signal on which a device carried by an intruder is configured to transmit, the device can emit an attachment attempt that can be retrieved by the FAP 106'. Based on the attachment attempt, the FAP 106' can determine the identification and/or telephone number associated with the device.

The device identification component 204 can determine and/or record or store an identifier associated with devices in a detection range of the FAP 106' that fail to be listed on the white list of the FAP 106' (and/or devices otherwise deemed to be associated with an intruder). In some embodiments, the device identification component 204 can detect the attachment attempt emitted from the device, and the white list component 206 can determine that the device fails to be listed on the white list of the FAP 106'.

The device identification component 204 can determine the device information and/or telephone number based on the attachment attempt. The device information 306 and/or telephone number information 302 can be stored in the data storage 214' of the FAP 106' in some embodiments. In various embodiments, the device information can include a Mobile Station International Subscriber Directory Number (MSISDN) 304, an International Mobile Subscriber Identity (IMSI) and/or an International Mobile Equipment Identity (IMEI).

The FAP 106' can transmit the device information and/or telephone number to law enforcement, the security system 104, a command center for the security system or the like.

In some embodiments, the communication component 200 can transmit and/or receive signals to and/or from devices deemed to be associated with the intruder during an intrusion.

In particular, the FAP 106' can include information indicative of exception cases wherein the FAP 106' allows attachment by one or more devices that fail to appear on the white list of the FAP 106'. In one embodiments, the FAP 106' can allow devices in the area served by the FAP 106' to attach to the FAP 106' during an intrusion (notwithstanding the device fails to appear on the white lit for the FAP 106'). In some embodiments, the FAP 106' can allow devices in the area served by the FAP 106' to attach to the FAP 106' (notwithstanding the device fails to appear on the white lit for the FAP 106'), during a particular time of day, day of week, month or year and/or during particular days, weeks or months. In various embodiments, the exception can be updated to address special circumstances of the property owner (e.g., to coincide with times during which the property owner expects to be away from the secure area). As such, the FAP 106' can allow communication via the FAP 106' with a device potentially associated with an intruder during an intrusion.

In some cases, if the device that is discovered during the intrusion is not listed on the white list for the FAP 106', the FAP 106' does not allow the device to attach to the FAP 106'. Accordingly, while the device is detached from the FAP 106' and frequencies are being jammed, the device is unable to transmit and/or receive telephone calls.

The warning generation component 208 can generate a signal to initiate one or more different types of warnings of the intrusion. In various embodiments, the warnings can be automated warnings that are generated automatically in response to the detection of the device identification and/or telephone number of the device deemed to be associated with an intruder.

In some embodiments, for example, the warning generation component 208 can generate warnings in the form of telephone calls transmitted to the device associated with the intruder. The telephone calls can warn the intruder that the burglary has been identified and/or that law enforcement will be arriving shortly.

In some embodiments, the warning generation component 208 can transmit information to the security system 104. The security system 104 and/or a command center associated with the security system 104 can transmit a warning to the secure area 102 in some embodiments. For example, in some embodiments, the warning generation component 208 can generate a signal that causes an audio device in the secure area 102 to emit a warning. In these examples, audio communication via speaker or other device in the secure area 102 can be employed to output an audible warning.

The tracking initiation component 210 can initiate tracking of the device associated with the intruder. Tracking can be initiated and/or performed in a number of different ways. For example, in some embodiments, the FAP 106' can allow the device to attach to the FAP 106' (notwithstanding the device is not on the white list of the FAP 106'). The FAP 106' can then track whether the device is attached to the FAP 106' or whether the device is detached from the FAP 106' (and has thus left the area served by the FAP 106'). In embodiments wherein the device is tracked such that the tracking initiation component 210 is able to determine whether the device is still in the area associated with the FAP 106', such information can be provided to law enforcement and/or owners of the secure area experiencing the intrusion. Accordingly, in various embodiments, safety for law enforcement and property owners and/or the likelihood of apprehension of intruders can be enhanced.

In another embodiment, the tracking initiation component 210 can generate a signal to cause text messages to be sent to the device deemed to be associated with the intruder. The tracking initiation component 210 can track the location of the device based, at least, on signals received in response to the text messages sent to the device.

In another embodiment, the tracking initiation component 210 can communicate with a macro cell in a core network 108 to which the FAP 106' is communicatively coupled. The tracking initiation component 210 can transmit to the macro cell information indicative of the device identification and/or telephone number. The macro cell can initiate tracking of the location of the device upon commencement of a telephone call from the macro cell. Accordingly, in some embodiments, the device can be tracked hours and/or days after the intrusion has occurred to increase the likelihood of intruder apprehension. In some embodiments, the tracking can be global positioning system (GPS) tracking.

Processor 214 can perform one or more of the functions described herein with reference to the FAP 106'. The memory 212 can be a computer-readable storage medium storing computer-executable instructions and/or information configured to perform one or more of the functions described herein with reference to the FAP 106'.

The data storage 216 can be configured to store information transmitted to, received by and/or processed by the FAP 106'. The data storage 216 can be described in greater detail with reference to FIG. 3.

FIGS. 4-9 illustrate example flowcharts of methods that facilitate security employing an FAP. For simplicity of explanation, the methodologies are depicted and described as a series of acts. It is to be understood and appreciated that the embodiments is not limited by the acts illustrated and/or by the order of acts, for example acts can occur in various orders and/or concurrently, and with other acts not presented and described herein. Furthermore, not all illustrated acts can be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed herein are capable of being stored on an article of manufacture to facilitate transporting and transferring such methodologies to computers.

Figure 4:
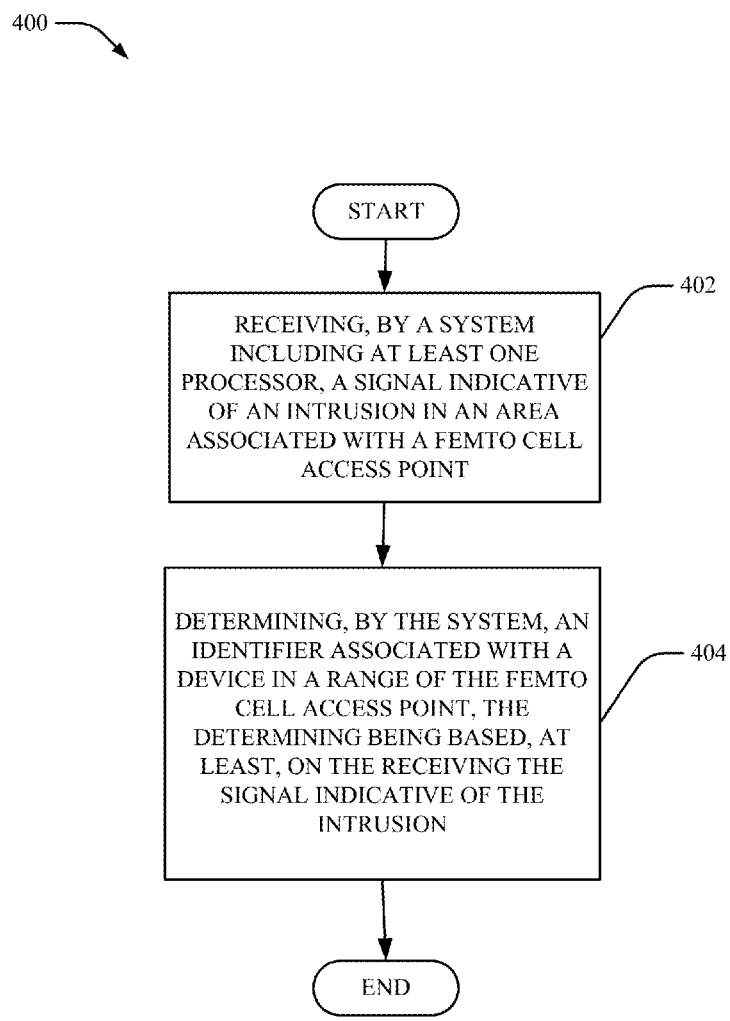
FIGS. 4-9 illustrate example flowcharts of methods that facilitate security employing an FAP.

Turning first to FIG. 4, a method that facilitates security employing an FAP is provided. At 402, method 400 can include receiving a signal indicative of an intrusion in an area associated with an FAP. At 404, method 400 can include determining an identifier associated with a device in a detection range of the FAP. Determining can be based, at least, on receiving the signal indicative of the intrusion.

Figure 5:
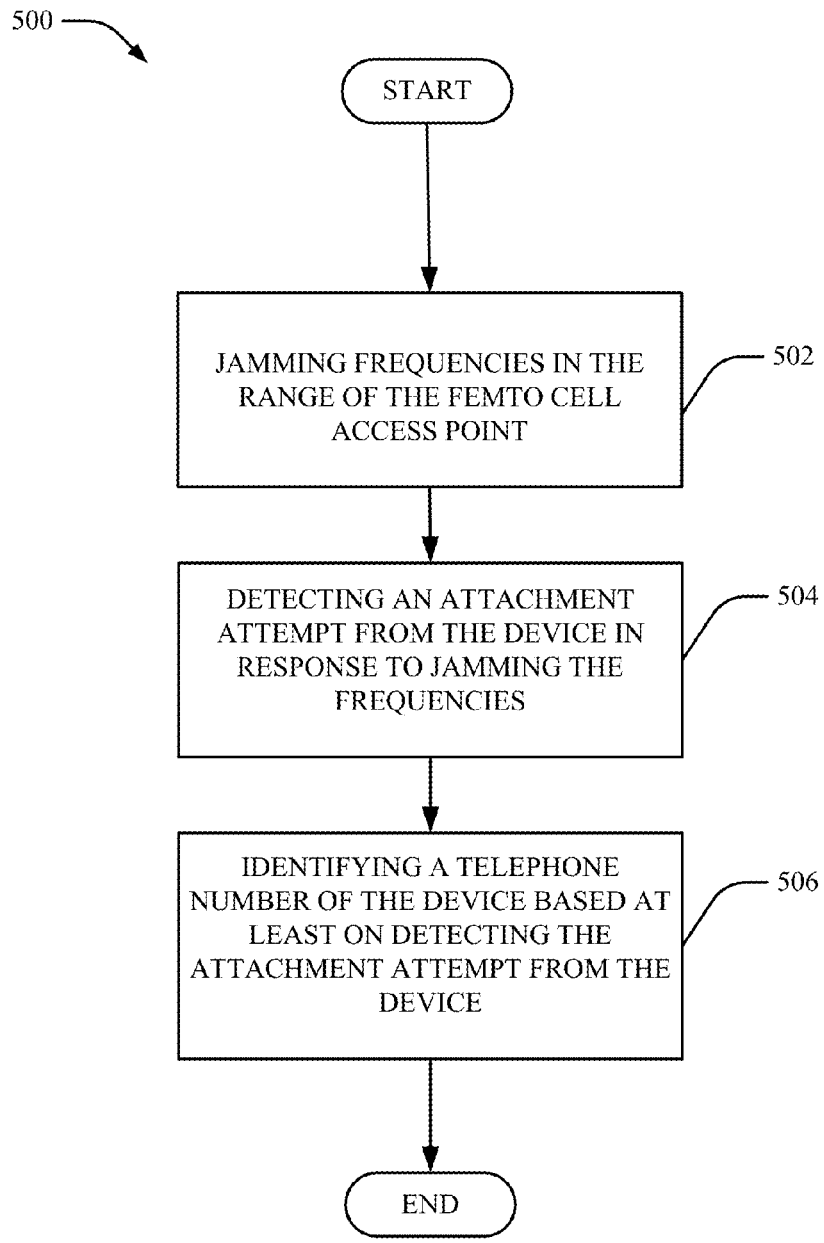

Turning now to FIG. 5, a method that facilitates security employing an FAP is provided. At 502, method 500 can include jamming frequencies in the detection range of the FAP. At 504, method 500 can include detecting an attachment attempt emitted from a device in response to the jammed frequencies. At 506, method 500 can include identifying a telephone number of the device based, at least, on detecting the attachment attempt from the device.

Figure 6:
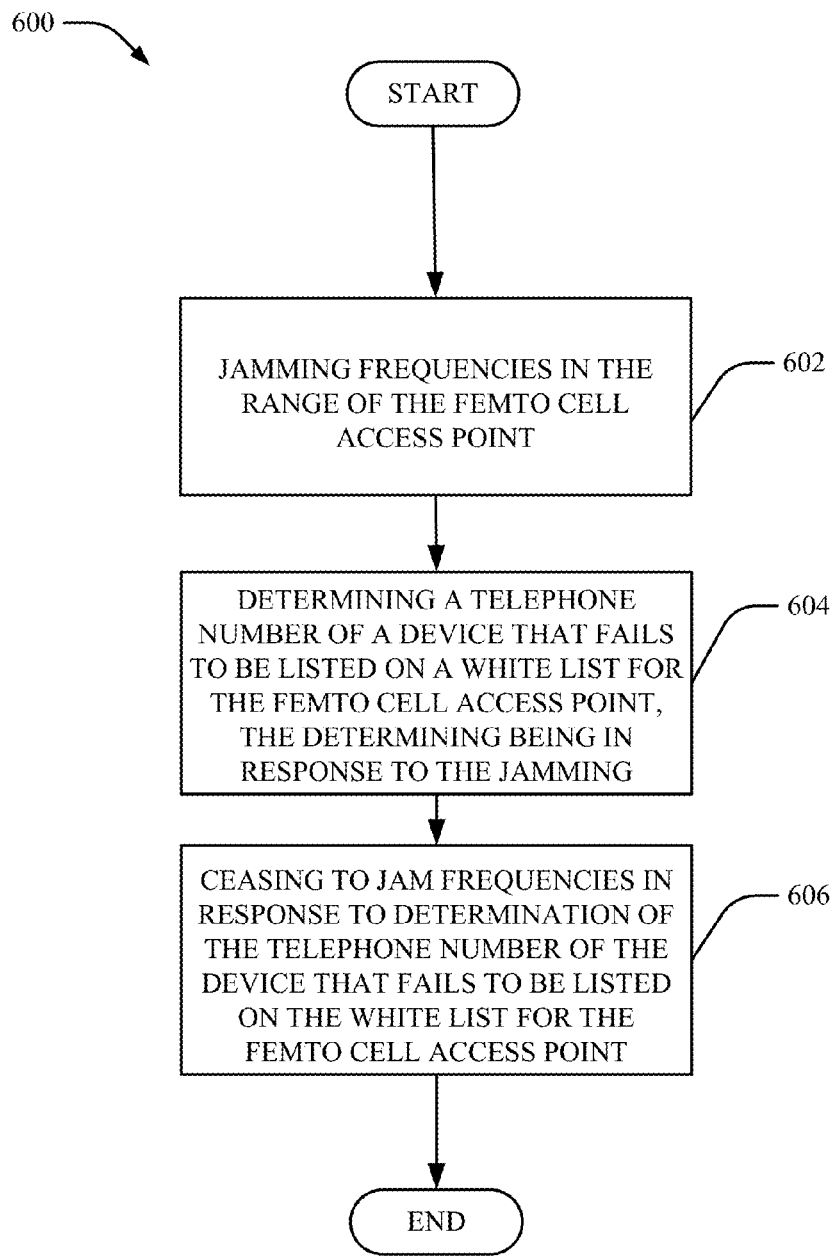

Turning now to FIG. 6, another method that facilitates security employing an FAP is provided. At 602, method 600 can include jamming frequencies in the detection range of the FAP. At 604, method 600 can include determining a telephone number of a device that fails to be listed on a white list for the FAP, wherein the determining is in response to the jamming of the frequencies. At 606, method 600 can include ceasing to jam frequencies in response to the determination of the telephone number of the device that fails to be listed on the white list for the FAP.

Figure 7:
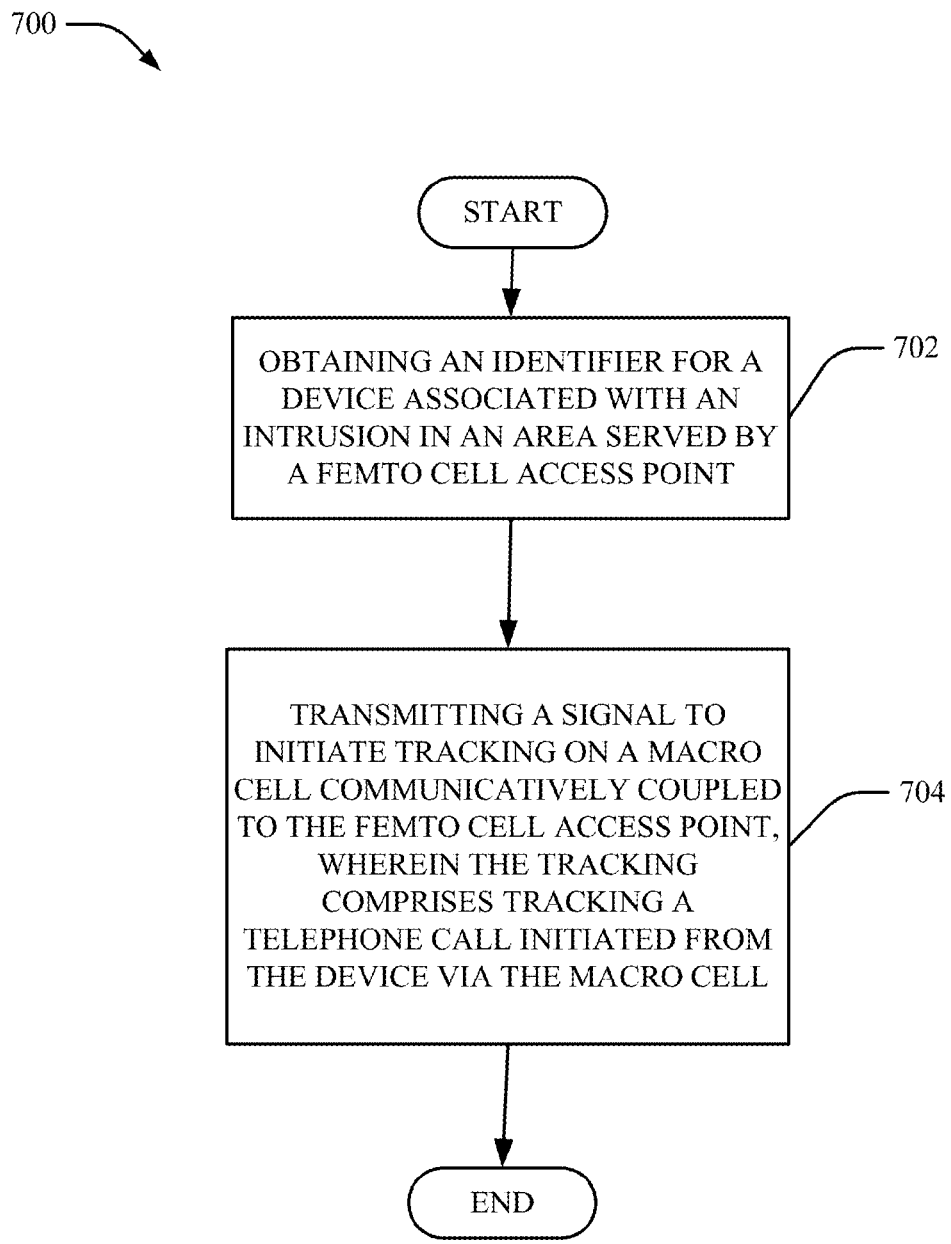

Turning now to FIG. 7, yet another method that facilitates security employing an FAP is provided. At 702, method 700 can include obtaining an identifier for a device associated with an intrusion in an area served by an FAP. At 704, method 700 can include transmitting a signal to initiate tracking on a macro cell communicatively coupled to the FAP. In various embodiments, a tracking area update can be initiated on the macro cell. In various embodiments, the tracking can include tracking a telephone call initiated via the macro cell. In various embodiments, method 700 can include changing Location Area (in UMTS or GSM systems) or Tracking Area (in LTE systems) to initiate tracking area updates.

Figure 8:
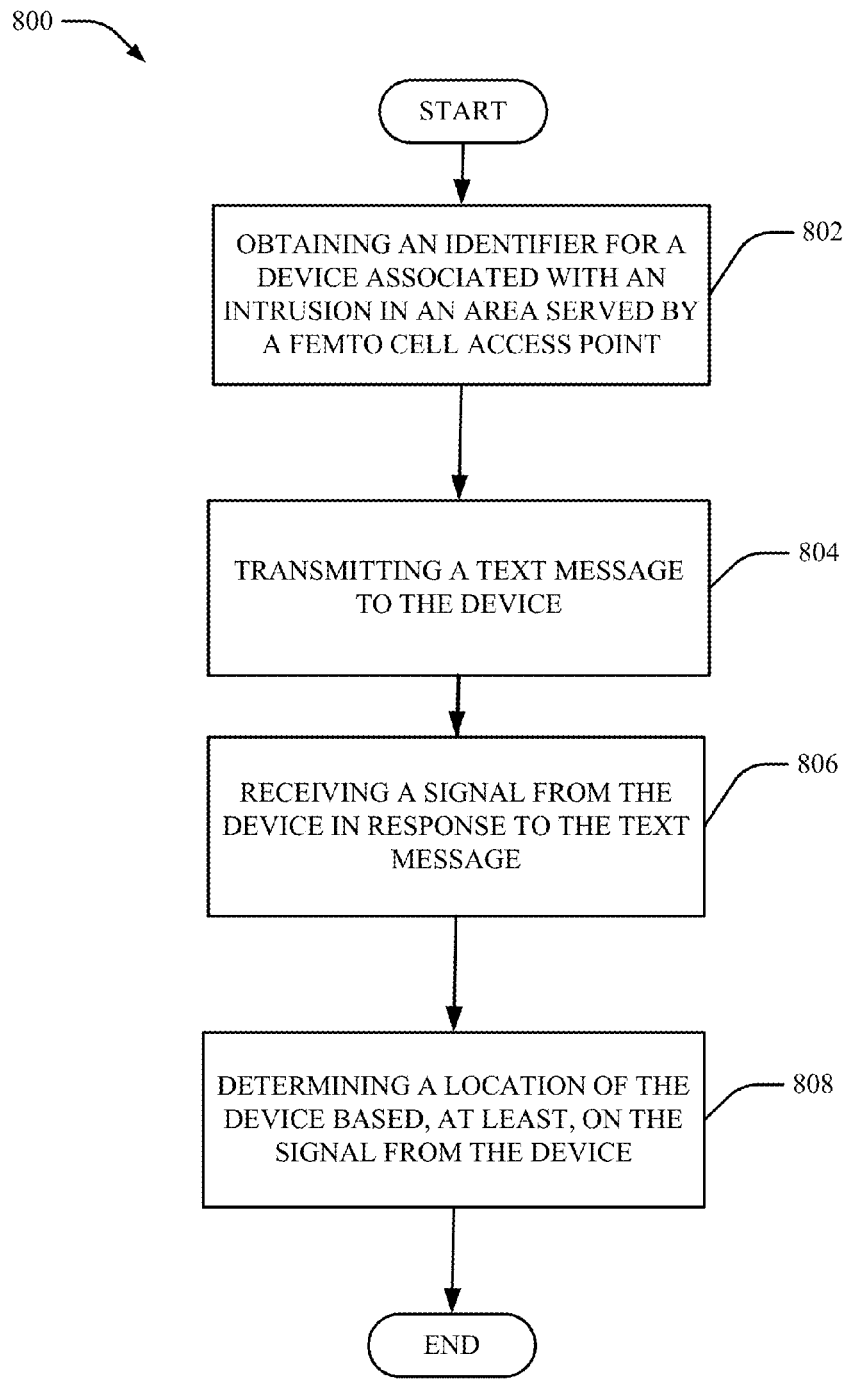

Turning now to FIG. 8, yet another method that facilitates security employing an FAP is provided. At 802, method 800 can include obtaining an identifier for a device associated with an intrusion in an area served by an FAP. At 804, method 800 can include transmitting a text message to the device. At 806, method 800 can include receiving a signal from the device in response to the text message. At 808, method 800 can include determining a location of the device based, at least, on the signal from the device.

Figure 9:
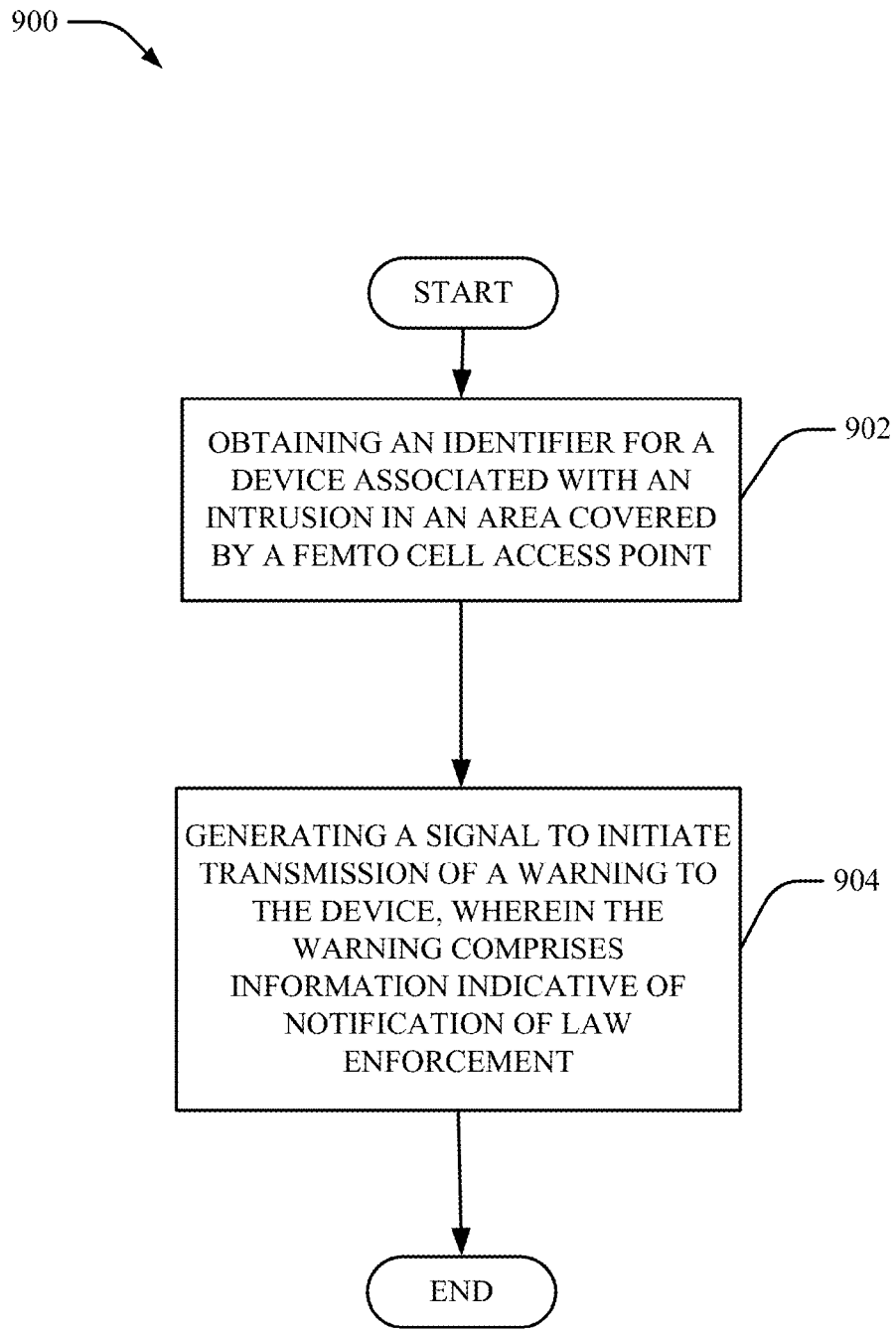

Turning now to FIG. 9, yet another method that facilitates security employing an FAP is provided. At 902, method 900 can include obtaining an identifier for a device associated with an intrusion in an area served by an FAP. At 904, method 900 can include generating a signal to initiate transmission of a warning to the device. In some embodiments, the warning can include information indicative of notification of law enforcement. Although not shown, in some embodiments, a warning can be transmitted from a command center associated with a home security system that generates the signal indicative of the intrusion.

Figure 10:
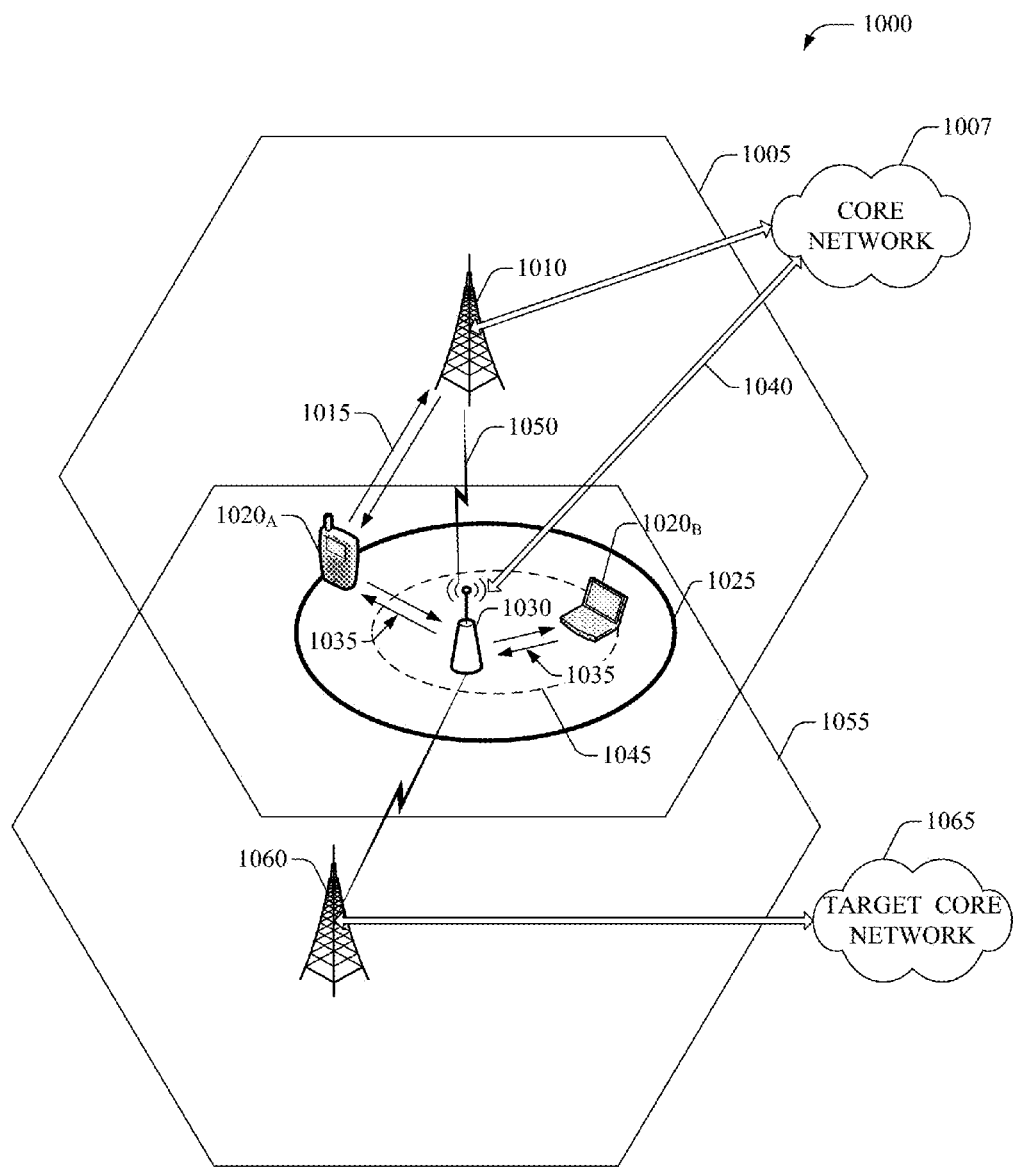
FIG. 10 illustrates an example wireless communication environment with associated components that facilitate security employing an FAP.

FIG. 10 illustrates an example wireless communication environment with associated components that facilitate utilizing an FAP to facilitate security. In wireless environment 1000, 1005 and 1055 can represent coverage macro cells, which can be served by base stations 1010 and 1080 (e.g., coupled to a target core network 1085 that can be operated by an acquired service provider), respectively. Macro cell coverage can be generally intended for outdoors locations for servicing mobile devices (e.g., user equipment (UE) 1040$_A$), and such coverage can be achieved via a wireless link 1015.

Within macro cell coverage cell 1005, a femto cell 1065, served by a FAP 1030, can be deployed. For example, FAP 1030 can include one or more of the structure and/or functionality of FAP 106, 106' described herein.

A femto cell typically can cover an area 1045 that can be determined, at least in part, by transmission power allocated to FAP 1030, path loss, shadowing, and so forth. Coverage area typically can be spanned by a coverage radius that detection ranges from 20 to 50 meters. Confined coverage area 1065 can be generally associated with an indoors area or a building, which can span about 5000 sq. ft. In some embodiments, the indoors area or building can be or include secure area 102.

Generally, FAP 1030 typically can service a number (e.g., a few or more) wireless devices (e.g., subscriber station 1040$_B$) within confined coverage area 1065. In an embodiment, FAP 1030 can integrate seamlessly with substantially any packet-switched (PS)-based and circuit-switched (CS)-based network; for instance, FAP 1030 can integrate into an existing 3GPP Core via conventional interfaces like Iu-CS, Iu-PS, Gi and/or Gn interfaces. In another embodiment, FAP 1030 can exploit high-speed downlink packet access in order to accomplish substantive bitrates. In yet another embodiment, FAP 1030 has a location area code (LAC) and/or routing area code (RAC) that can be different from the underlying macro cell network. These LAC and RAC can be used to identify subscriber station location for a variety of reasons, most notably to direct incoming voice and data traffic to appropriate paging transmitters.

As a subscriber station, e.g., UE 1040$_A$, can leave macro cell coverage (e.g., cell 1005) and enter femto cell coverage (e.g., area 1015), as illustrated in environment 1000. In some embodiments, a carrier frequency scan can be triggered by the UE 1040$_A$, which can detect the FAP 1030. UE 1040$_A$ can attempt to attach to the FAP 1030 through transmission and reception of attachment signaling, effected via a forward link (FL)/reverse link (RL) 1035; in an embodiment, the attachment signaling can include a Location Area Update (LAU) and/or Routing Area Update (RAU). Attachment attempts can be a part of procedures to ensure mobility, so voice calls and sessions can continue even after a macro cell-to-femto cell transition or vice versa. It is noted that UE 1040 can be employed seamlessly after either of the foregoing transitions.

As described above, in various embodiments, FAP 1030 can jam frequencies for a UE 1040$_A$ in the area of the FAP 1030 and UE 1040$_A$ can emit attachment attempts in response to the jamming. The FAP 1030 can detect device information and/or telephone information for UE 1040$_A$ based on the attachment attempt emitted from UE 1040$_A$.

Femto cell networks can be designed to serve stationary or slow-moving traffic with reduced signaling loads compared to macro cell networks. A femto cell service provider (e.g., an entity that commercializes, deploys, and/or utilizes FAP 1030) therefore can be inclined to minimize unnecessary LAU/RAU signaling activity at substantially any opportunity to do so, and through substantially any available means. It is noted that substantially any mitigation of unnecessary attachment signaling/control can be advantageous for femto cell operation. Conversely, if not successful, UE 1040 generally can be commanded (through a variety of communication means) to select another LAC/RAC or enter "emergency calls only" mode. It can be appreciated that this attempt and handling process can occupy significant UE battery, and FAP capacity and signaling resources as well.

When an attachment attempt is successful, UE 1040 can be allowed to camp on femto cell 1045 and incoming voice and data traffic can be paged and routed to the subscriber station through the FAP 1030. As described above, in various embodiments, an FAP 1030 can allow a UE 1040 associated with an intruder into secure area 102 to attach to FAP 1030 in the case in which an exception to the rules governing the white list for the FAP 1030 occurs.

Data traffic can be routed through a backhaul broadband wired network backbone 1060 (e.g., optical fiber backbone, twisted-pair line, T1/E1 phone line, DSL or coaxial cable). In some embodiments, an FAP 1030 can rely on a backhaul network backbone 1060 for routing and paging, and for packet communication, substantially any quality of service can handle heterogeneous packetized traffic. Namely, packet flows established for wireless communication devices (e.g., terminals 1040$_A$ and 1040$_B$) served by FAP 1030, and for devices served through the backhaul network pipe 1060. To improve the likelihood of positive subscriber experience or perception, FAP 1030 can maintain a high level of throughput for traffic (e.g., voice and data) utilized on a mobile device for one or more subscribers while in the presence of external, additional packetized or broadband, traffic associated with applications (e.g., web browsing, data transfer (e.g., content upload), and the like) executed in devices within the femto cell coverage area (e.g., area 1045 or area 1065).

Figure 11:
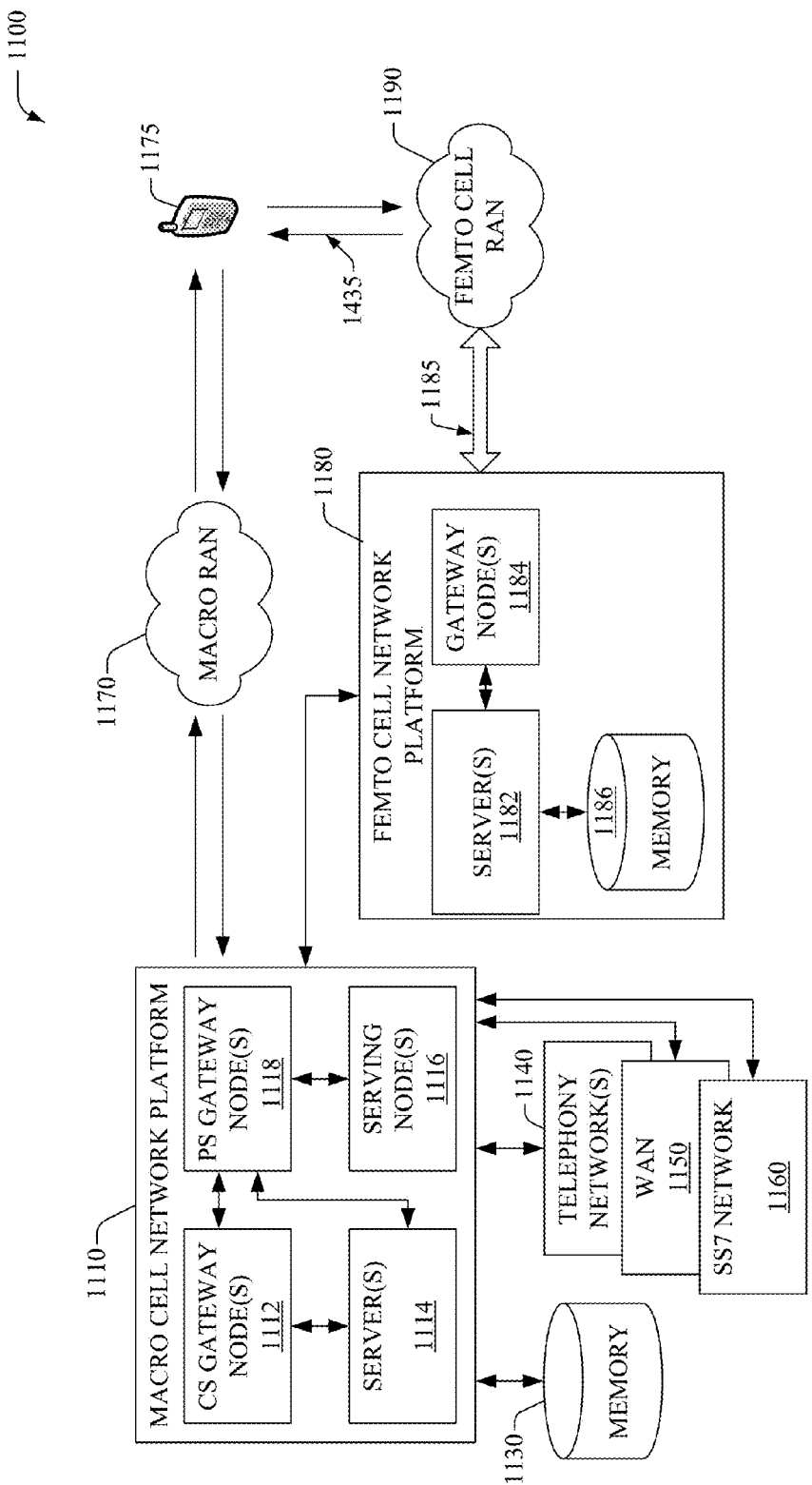
FIG. 11 illustrates a schematic deployment of a macro cell and a femto cell to facilitate security employing an FAP.
Figure 12:
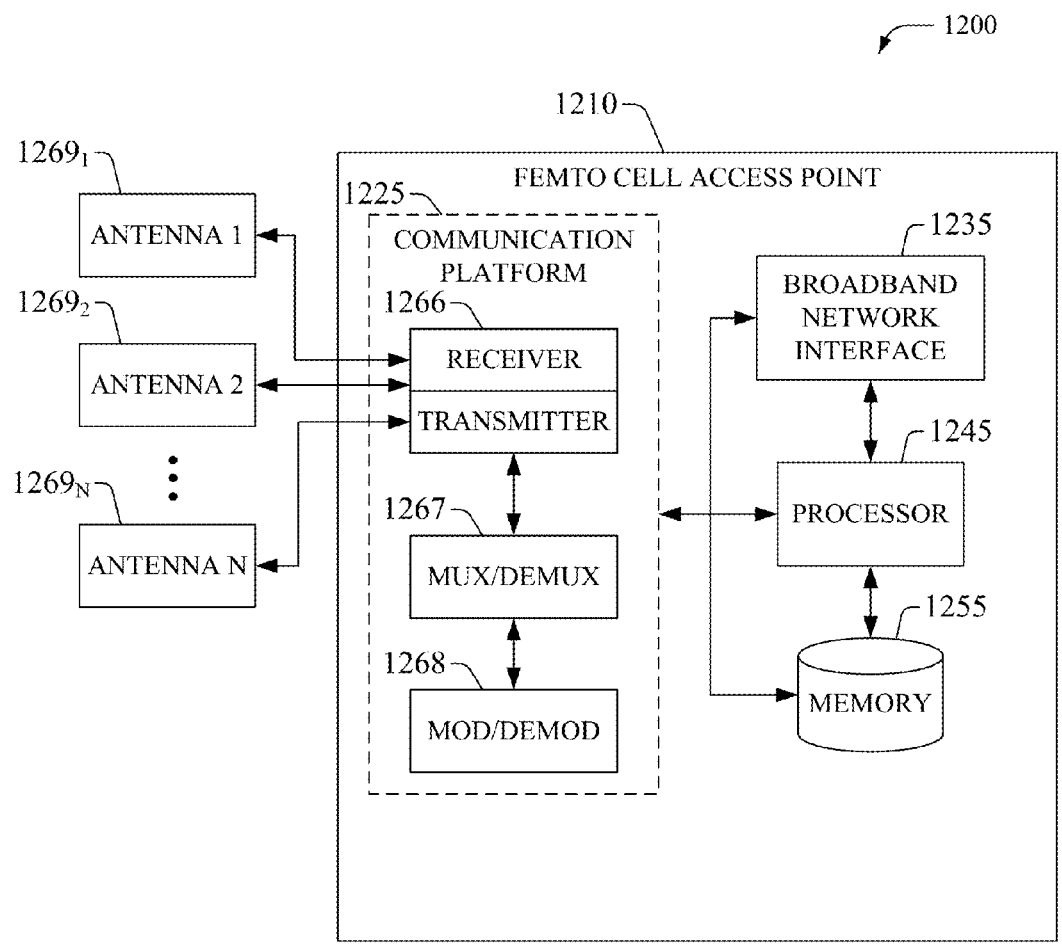
FIG. 12 illustrates another example embodiment of an FAP that can be utilized to facilitate security.

To provide further context for various embodiments described herein, FIGS. 11 and 12 illustrate an example wireless communication environment 1100, with associated components for operation of a femto cell, and a block diagram of an example embodiment 1200 of a FAP, which can facilitate utilizing an FAP to facilitate security.

Wireless communication environment 1100 includes two wireless network platforms: (i) A macro cell network platform 1110 that serves or facilitates communication) with user equipment 1175 via a macro cell radio access network (RAN) 1170. It should be appreciated that in cellular wireless technologies (e.g., 3GPP UMTS, high speed packet access (HSPA), 3GPP LTE, 3GPP ultra mobile broadband (UMB)), macro cell network platform 1110 can be embodied in a Core Network. (ii) A femto cell network platform 1180, which can provide communication with UE 1175 through a femto cell RAN 1190 linked to the femto cell network platform 1180 via backhaul pipe(s) 1185, wherein backhaul pipe(s) are substantially the same a backhaul link 840. It should be appreciated that femto cell network platform 1180 typically offloads UE 1175 from macro cell network, once UE 1175 attaches (e.g., through macro-to-femto cell handover or via a scan of channel resources in idle mode) to femto cell RAN.

A RAN can include one or more base stations or APs, and its associated electronic circuitry and deployment cell site (s), in addition to a wireless radio link operated in accordance with the base station(s). Accordingly, macro cell RAN 1170 can comprise various coverage cells like cell 1005, while femto cell RAN 1190 can comprise multiple FAPs. As mentioned above, deployment density in femto cell RAN 1190 can be substantially higher than in macro cell RAN 1170.

Generally, both macro cell and femto cell network platforms 1110 and 1180 can include components, e.g., nodes, gateways, interfaces, servers or platforms, that facilitate both PS and CS traffic (e.g., voice and data) and control generation for networked wireless communication. For example, macro cell network platform 1110 includes CS gateway node(s) 1112 which can interface CS traffic received from legacy networks like telephony network(s) 1140 (e.g., public switched telephone network (PSTN) or public land mobile network (PLMN)) or a SS7 network 1160. Moreover, CS gateway node(s) 1112 interfaces CS-based traffic and signaling and gateway node(s) 1118.

In addition to receiving and processing CS-switched traffic and signaling, gateway node(s) 1118 can authorize and authenticate PS-based data sessions with served (e.g., through macro cell RAN) wireless devices. Data sessions can include traffic exchange with networks external to the macro cell network platform 1110, like wide area network(s) (WANs) 1150; it should be appreciated that local area network(s) (LANs) can also be interfaced with macro cell network platform 1110 through gateway node(s) 1118. Gateway node(s) 1118 can generate packet data contexts when a data session is established. It should be further appreciated that the packetized communication can include multiple flows that can be generated through server(s) 1114. Macro cell network platform 1110 also includes serving node(s) 1116 that convey the various packetized flows of information or data streams, received through gateway node(s) 1118. Server(s) 1114 can include one or more processor configured to confer at least in part the functionality of macro cell network platform 1110. To that end, the one or more processor can execute code instructions stored in memory 1130, for example.

In example wireless environment 1100, memory 1130 stores information related to operation of macro cell network platform 1110. Information can include business data associated with subscribers; market plans and strategies (e.g., promotional campaigns, business partnerships; operational data for mobile devices served through macro cell network platform; service and privacy policies; end-user service logs for law enforcement). Memory 1130 can also store information from at least one of telephony network(s) 1140, wide area network (WAN) 1150 or signaling system number 7 (SS7) network 1160.

Femto cell gateway node(s) 1184 have substantially the same functionality as PS gateway node(s) 1118. Additionally, femto cell gateway node(s) 1184 can also include substantially all functionality of serving node(s) 1116. In an embodiment, femto cell gateway node(s) 1184 facilitates handover resolution (e.g., assessment and execution). Server (s) 1182 have substantially the same functionality as described in connection with server(s) 1114 and can include one or more processors configured to confer at least in part the functionality of macro cell network platform 1110. Moreover, the analysis component 1114 can be implemented or executed by server(s) 1182 and/or server(s) 1114. To that end, the one or more processor can execute code instructions stored in memory 1186, for example.

Memory 1186 can include information relevant to operation of the various components of femto cell network platform 1180. For example operational information that can be stored in memory 1186 can comprise, but is not limited to, subscriber information; contracted services; maintenance and service records; femto cell configuration (e.g., devices served through femto cell RAN 1190; access control lists or white lists); service policies and specifications; privacy policies; add-on features; femto cell measurement data).

With respect to FIG. 12, in example embodiment 1200, FAP 1210 can receive and transmit signal(s) (e.g., traffic and control signals) from and to wireless devices, access terminals, wireless ports and routers, etc., through a set of antennas $1269_1$-$1269_N$. It should be appreciated that while antennas $1269_1$-$1269_N$ are a part of communication platform 1225, which comprises electronic components and associated circuitry that provides for processing and manipulating of received signal(s) (e.g., a packet flow) and signal(s) (e.g., a broadcast control channel) to be transmitted. In an embodiment, communication platform 1225 includes a transmitter/receiver (e.g., a transceiver) 1266 that can convert signal(s) from analog format to digital format upon reception, and from digital format to analog format upon transmission. In addition, receiver/transmitter 1266 can divide a single data stream into multiple, parallel data streams or perform the reciprocal operation. Coupled to transceiver 1266 is a multiplexer/demultiplexer 1267 that facilitates manipulation of signal in time and frequency space. Electronic component 1267 can multiplex information (data/traffic and control/signaling) according to various multiplexing schemes such as time division multiplexing (TDM), frequency division multiplexing (FDM) orthogonal frequency division multiplexing (OFDM), code division multiplexing (CDM), space division multiplexing (SDM). In addition, mux/demux component 1267 can scramble and spread information (e.g., codes) according to substantially any code known in the art; e.g., Hadamard-Walsh codes, Baker codes, Kasami codes, polyphase codes, and so on. A modulator/demodulator 1268 can be also a part of operational group 1225, and can modulate information according to multiple modulation techniques, such as frequency modulation, amplitude modulation (e.g., M-ary quadrature amplitude modulation (QAM), with M a positive integer), phase-shift keying (PSK), and the like.

FAP 1210 also includes a processor 1245 configured to confer functionality, at least partially, to substantially any electronic component in the FAP 1210, in accordance with embodiments of the embodiments. In particular, processor 1245 can facilitate FAP 1210 to implement configuration instructions received through communication platform 1225, which can include storing data in memory 1255. In addition, processor 1245 facilitates FAP 1210 to process data (e.g., symbols, bits or chips) for multiplexing/demultiplexing, such as effecting direct and inverse fast Fourier transforms, selection of modulation rates, selection of data packet formats, inter-packet times, etc. Moreover, processor 1245 can manipulate antennas $\mathbf{1269_1}\text{-}\mathbf{1269_N}$ to facilitate beamforming or selective radiation pattern formation, which can benefit specific locations (e.g., basement, home office) served by the FAP; and exploit substantially any other advantages associated with smart-antenna technology. Memory 1255 can store data structures, code instructions, system or device information like device identification codes (e.g., International Mobile Subscriber Identity (IMSI), an International Mobile Equipment Identity (IMEI), a Mobile Station International Subscriber Directory Number (MSISDN) or a serial number) and specification such as multimode capabilities; code sequences for scrambling; spreading and pilot transmission, floor plan configuration, AP deployment and frequency plans; and so on. Moreover, memory 1255 can store configuration information such as schedules and policies; FAP address(es) or geographical indicator(s); access lists (e.g., white lists); license(s) for utilization of add-features for FAP 1210, and so forth. In some embodiments, data storage 216, 214' can be implemented in memory 1255.

In embodiment 1200, processor 1245 is coupled to the memory 1255 in order to store and retrieve information necessary to operate and/or confer functionality to communication platform 1225, broadband network interface 1235 (e.g., a broadband modem), and other operational components (e.g., multimode chipset(s), power supply sources) that support FAP 1210. In addition, various embodiments disclosed herein can also be implemented through (i) program modules stored in a computer-readable storage medium or memory (e.g., memory 1186 or memory 1255) and executed by a processor (e.g., processor 1245) and/or (ii) one or more other combinations of hardware and software or hardware and firmware.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The systems and/or methods described herein can employ artificial intelligence (AI) to facilitate automating one or more features in accordance with the embodiments. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc. The criteria can include, but is not limited to, historical patterns, UE behavior, user preferences, service provider preferences and/or policies, FAP parameters, location of the femto cell, location of the acquired cell sites, etc.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the various embodiments is intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
receiving, by a system comprising a processor, a signal indicative of an intrusion in an area associated with a femto cell access point device, wherein the signal has also been directed to the femto cell access point device;
determining, by the system, an identifier associated with a device in a detection range of the femto cell access point device, based on the receiving the signal indicative of the intrusion, wherein the determining comprises jamming a frequency in the detection range of the femto cell access point device, and wherein the determining comprises detecting an attachment attempt by the device in response to the frequency being jammed; and
generating, by the system, another signal to cause a warning to be transmitted to the device, wherein the warning to the device comprises information indicating that a notification of the intrusion has been sent to another device, and wherein the other device is a law enforcement device.

2. The method of claim 1, wherein the determining further comprises:
identifying a telephone number of the device based at least on the detecting the attachment attempt from the device.

3. The method of claim 2, further comprising transmitting, by the system, the telephone number of the device.

4. The method of claim 2, further comprising storing, by the system, the telephone number of the device.

5. The method of claim 2, further comprising generating, by the system, a signal to initiate tracking of the device.

6. The method of claim 5, wherein the tracking comprises tracking using global positioning system data associated with the device.

7. The method of claim 2, wherein the signal is a first signal, the other signal is a second signal, and further comprising:
transmitting, by the system, a third signal to initiate a tracking area update on a macro cell device coupled to the femto cell access point device.

8. The method of claim 7, wherein the initiating the tracking area update comprises initiating tracking of a telephone call initiated via the macro cell device.

9. The method of claim 1, wherein the information comprises a text message.

10. The method of claim 1, wherein the system is the femto cell access point device.

11. The method of claim 1, wherein the warning is provided via an audio device in the detection range of the femto cell access point device.

12. A system, comprising:
a processor; and
a memory that stores executable instructions that, when executed by the processor, facilitate performance of operations, comprising:
based on receiving a signal indicative of an intrusion in an area associated with a femto cell access point device, determining an identifier associated with a device in a detection range of the femto cell access point device, wherein the determining comprises:
detecting an attachment attempt emitted from the device in response to an emission of energy having a frequency in the detection range of the femto cell access point device, and detecting a telephone number of the device based on the detecting of the attachment attempt emitted from the device; and transmitting another signal to transfer a tracking from the area associated with the femto cell access point device to another area controlled by a macro cell device, wherein the tracking in the other area is based on tracking a telephone call initiated from the other area.

13. The system of claim 12, wherein the determining the identifier further comprises:

emitting the emission of energy using the frequency in the detection range of the femto cell access point device.

14. The system of claim 13, wherein the operations further comprise transmitting the telephone number of the device.

15. The system of claim 13, wherein the operations further comprise storing the telephone number of the device.

16. The system of claim 13, wherein the signal is a first signal, and the operations further comprise generating a second signal to initiate a tracking of the device.

17. The system of claim 16, wherein the operations further comprise:

transmitting a text message to the device;

receiving a third signal from the device in response to the transmitting the text message; and determining a location of the device based on the third signal from the device.

18. The system of claim 13, wherein the operations further comprise:

transmitting another signal to initiate a tracking operation on the macro cell device communicatively coupled to the femto cell access point device, and wherein the tracking operation comprises tracking another telephone call initiated via the macro cell device.

19. A non-transitory machine-readable storage medium, comprising executable instructions that, when executed by a processor, facilitate performance of operations, comprising:

receiving a signal indicative of an intrusion in an area associated with a femto cell access point device;

determining an identifier associated with a device in a detection range of the femto cell access point device, the determining being based on the signal;

jamming a frequency in the detection range of the femto cell access point device;

detecting an attachment attempt emitted from the device in response to the jamming the frequency;

identifying a telephone number of the device based on the detecting of the attachment attempt from the device; and generating another signal to cause a warning to be transmitted to the device, wherein the warning comprises information confirming that a notification to another system has been initiated, and wherein the information comprises a text message.

20. The non-transitory computer-readable storage device of claim 19, wherein the receiving the signal indicative of the intrusion comprises receiving the signal from a security system comprising another processor for the area associated with the femto cell access point device.

* * * * *